(12) United States Patent
Kakumoto

(10) Patent No.: US 6,812,448 B2
(45) Date of Patent: Nov. 2, 2004

(54) SOLID-STATE IMAGE-SENSING DEVICE

(75) Inventor: Tomokazu Kakumoto, Nagaokakyo (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/317,355

(22) Filed: Dec. 12, 2002

(65) Prior Publication Data

US 2004/0065803 A1 Apr. 8, 2004

(30) Foreign Application Priority Data

Sep. 19, 2002 (JP) .......................... 2002-273238

(51) Int. Cl.⁷ .................. H01L 27/00; H01L 31/062; H04N 3/14
(52) U.S. Cl. ................ 250/208.1; 250/214 R; 257/290; 257/291; 257/292; 257/293; 257/294; 348/302; 348/303; 348/304
(58) Field of Search ............ 250/208.1, 214 R; 257/290–294; 348/302–304, 308, 309, 311, 314

(56) References Cited

FOREIGN PATENT DOCUMENTS

JP   2002-077733   * 3/2002

OTHER PUBLICATIONS

U.S. patent application Ser. No. 09/922,763, Takada et al., filed Aug. 6, 2001.

* cited by examiner

Primary Examiner—Donghee Kang
(74) Attorney, Agent, or Firm—Sidley Austin Brown & Wood LLP (57) ABSTRACT

In a solid-state image-sensing device, an electric signal output from a photoelectric conversion circuit 100 is accumulated in a capacitor C1, and then a MOS transistor T5 is turned on so that the voltage integrated by the capacitor C1 is sampled in a MOS transistor T10. Thereafter, the electric charge obtained through amplification performed by the MOS transistor T10 flows into a capacitor C2, which performs integration so that a voltage commensurate with the integral of the amount of incident light appears at the capacitor C2.

20 Claims, 10 Drawing Sheets

PRIOR ART

SOLID-STATE IMAGE-SENSING DEVICE

This application is based on Japanese Patent Application No. 2002-273238 filed on Sep. 19, 2002, the contents of which are hereby incorporated by reference.

BACKGROUND OF THE INVENTION

1. Field of the Invention

The present invention relates to a solid-state image-sensing device of which all the pixels can perform image sensing operation with identical timing, and more particularly to a solid-state image-sensing device of which each pixel is provided with an integrating circuit.

2. Description of the Prior Art

Conventional solid-state image-sensing devices are classified roughly into a CCD type and a MOS type, according to the type of the means they use to read out the photoelectric charges generated in photoelectric conversion elements. CCD-type solid-state image-sensing devices transfer the photoelectric charges while accumulating them in potential wells, and have the disadvantage of narrow dynamic ranges. On the other hand, MOS-type solid-state image-sensing devices read out the electric charges accumulated in the pn-junction capacitance of photodiodes through MOS transistors.

In a MOS-type solid-state image-sensing device, while vertical scanning and horizontal scanning are performed, image sensing operation is performed in one pixel after another, and the image signals output from one pixel after another are serially fed out of the solid-state image-sensing device. Thus, each pixel performs image sensing operation with different timing. As a result, when an image of a subject in a constantly changing state is taken, it is impossible to perform image sensing operation under identical conditions in all the pixels. This may eventually lead to distortion in the obtained image.

Figure 10:
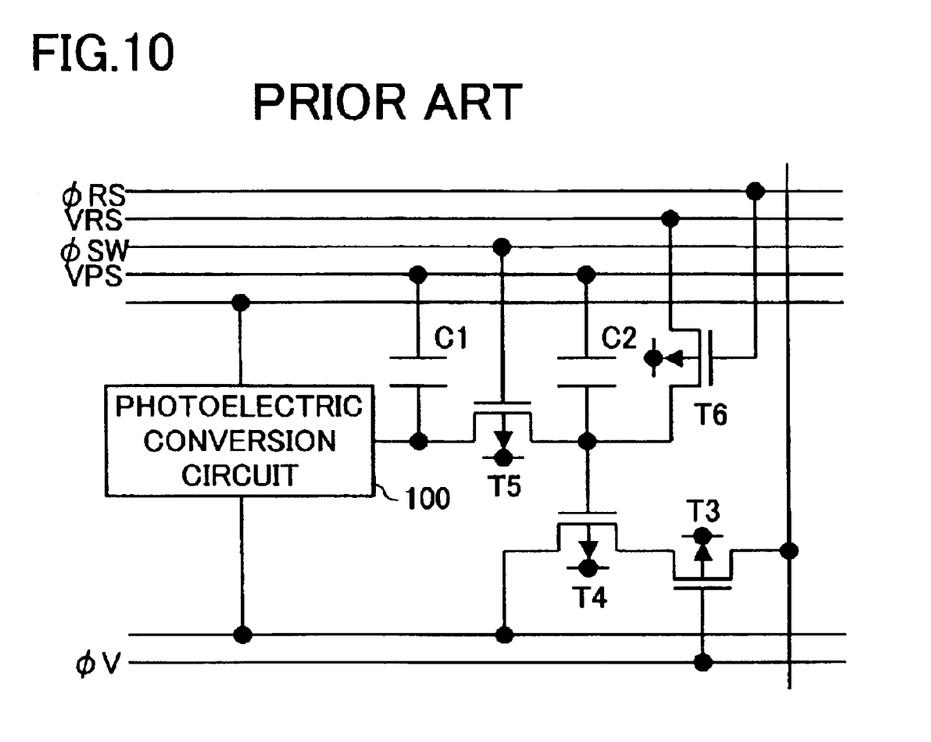
FIG. 10 is a circuit diagram showing the configuration of each pixel of a conventional solid-state image-sensing device.

To overcome this inconvenience, Japanese Patent Application Laid-Open No. 2002-77733 proposes a solid-state image-sensing device of which each pixel is provided with two integrating circuits so that all the pixels perform image sensing operation with identical timing. The configuration of each pixel of this conventional solid-state image-sensing device is shown in FIG. 10. The pixel shown in FIG. 10 includes a photoelectric conversion circuit 100 that produces an electric signal commensurate with incident light, a capacitor C1 that integrates the electric signal fed from the photoelectric conversion circuit 100, a capacitor C2 that samples the electric signal integrated by the capacitor C1, a MOS transistor T4 that current-amplifies the electric signal sampled by the capacitor C2, a MOS transistor T5 that electrically connects and disconnects the capacitors C1 and C2 to and from each other, a MOS transistor T6 that functions as a switch for resetting the capacitor C2, and a MOS transistor T3 that functions as a switch for outputting, as an image signal, the electric signal fed from the MOS transistor T4.

In the solid-state image-sensing device having each pixel thereof configured as shown in FIG. 10, the photoelectric conversion circuit 100 and the MOS transistor T5 provided in all the pixels operate with identical timing. Thus, in all the pixels, the electric signal obtained through image sensing operation performed with identical timing is integrated by the capacitor C1, and is then sampled by the capacitor C2. Then, the MOS transistor T5 in each pixel is turned off, and thereafter horizontal scanning and vertical scanning are performed so that, from one pixel after another, an amplified image signal commensurate with the electric signal sampled by the capacitor C2 is output.

However, in the above-described configuration, where each pixel includes two integrating circuits connected successively with a switch between them, when the MOS transistor T5 is turned on, the capacitors C1 and C2 become connected in parallel. Thus, the signal electric charge accumulated in the first-stage capacitor C1 is divided between the capacitance of this capacitor C1 and the capacitance of the second-stage capacitor C2. Specifically, assuming that the capacitors C1 and C2 have equal capacitances in FIG. 10, when first the MOS transistor T5 is turned on to make the capacitor C2 perform sampling and then the MOS transistor T5 is turned off, half the electric charge integrated by the capacitor C1 remains in the capacitor C2. This reduces the sensitivity of the pixel in half compared with that obtained when the level integrated by the capacitor C1 is fed out directly.

SUMMARY OF THE INVENTION

An object of the present invention is to provide a solid-state image-sensing device of which all the pixels can perform image sensing operation with identical timing and that outputs image signals with reduced loss.

To achieve the above object, according to one aspect of the present invention, a solid-state image-sensing device is provided with: a photoelectric conversion circuit that generates the amount of electric charge commensurate with the amount of incident light; a first integrating circuit that outputs a voltage obtained by accumulating the electric charge fed from the photoelectric conversion circuit; and a second integrating circuit that performs amplification based on the voltage fed from the first integrating circuit, performs integration by accumulating the electric charge obtained through the amplification, and outputs as an image signal the voltage obtained through the integration.

According to another aspect of the present invention, in a solid-state image-sensing device including a plurality of pixels, the pixels are each provided with: a photoelectric conversion circuit that generates the amount of electric charge commensurate with the amount of incident light; a first capacitor that accumulates the electric charge fed from the photoelectric conversion circuit; a switch having one end thereof connected to the node between the first capacitor and the photoelectric conversion circuit; a transistor having a first electrode, a second electrode, and a control electrode, and having the control electrode thereof connected to the other end of the switch; and a second capacitor having one end thereof connected to the second electrode of the transistor. Here, in all the pixels, the first capacitor performs integration simultaneously, and then the switch is turned on simultaneously so that the second capacitor performs integration simultaneously.

According to still another aspect of the present invention, a method for outputting an image signal in a solid-state image-sensing device includes: a step of generating the amount of electric charge commensurate with the amount of incident light; a step of outputting a first voltage obtained by accumulating the electric charge generated; and a step of outputting as an image signal a second voltage obtained by accumulating the electric charge obtained by amplifying the first voltage.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Hereinafter, embodiments of the present invention will be described with reference to the drawings.

An Outline of the Configuration of a Solid-State Image-Sensing Device

Figure 1:
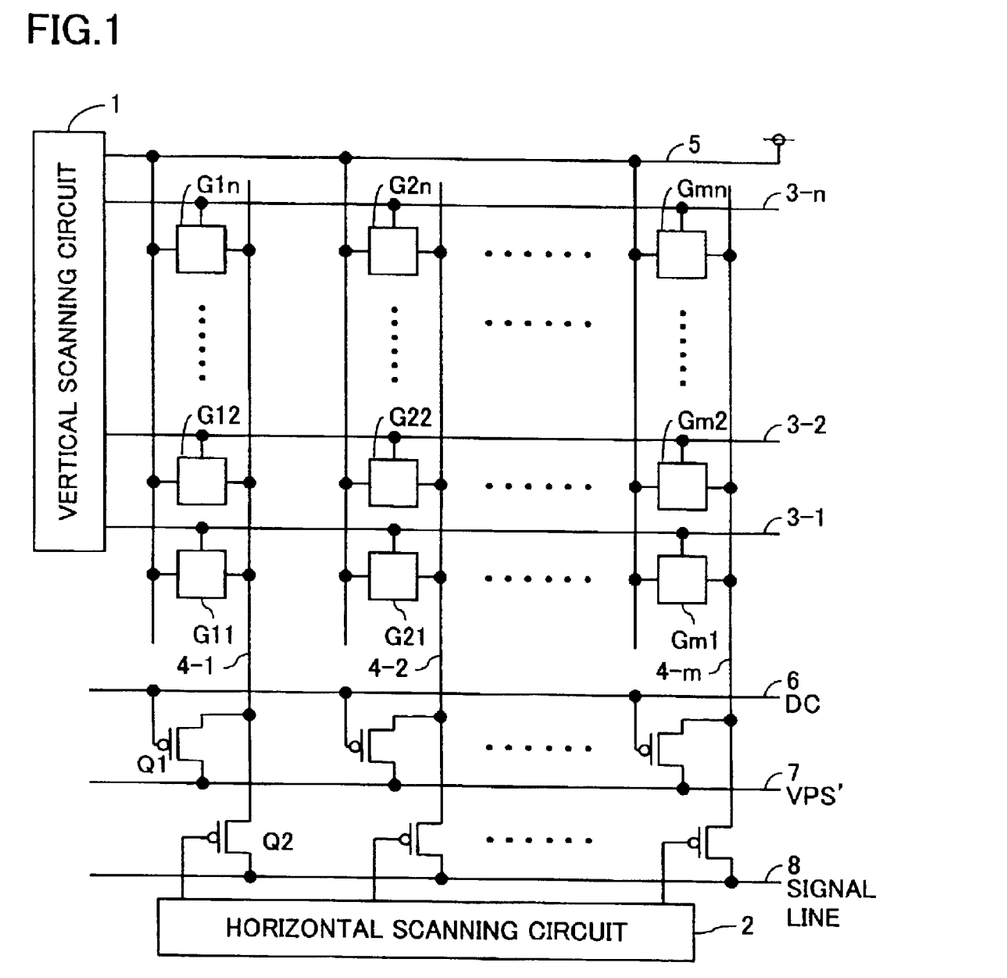
FIG. 1 is a block circuit diagram showing the configuration of a solid-state image-sensing device embodying the invention.

First, with reference to FIG. 1, the configuration of a solid-state image-sensing device which is common to all the embodiments described later will be explained. FIG. 1 is a block diagram of that configuration.

As shown in FIG. 1, the solid-state image-sensing device has a plurality of pixels G11 to Gmn arranged in a plurality of rows and columns (i.e., arranged in a matrix). A vertical scanning circuit 1 consecutively scans rows (line) 3-1, 3-2, ..., 3-n, by way of which a signal φV is fed to the individual pixels. A horizontal scanning circuit 2 consecutively reads out, in the horizontal direction, the photoelectric conversion signals delivered from one pixel after another to output signal lines 4-1, 4-2, ..., 4-m. The pixels are supplied with a supply voltage by way of a power supply line 5. It is to be noted that, in reality, the pixels are connected not only to the rows 3-1 to 3-n, output signal lines 4-1 to 4-m, and power supply line 5 mentioned above but also to other lines (for example, clock lines, bias supply lines, etc.), although these other lines are omitted in FIG. 1.

For each of the output signal lines 4-1, 4-2, ..., 4-m, a pair of P-channel MOS transistor Q1 and Q2 is provided. For example, with respect to the output signal line 4-1, the MOS transistor Q1 has its gate connected to a direct-current voltage line 6, has its drain connected to the output signal line 4-1, and has its source connected to a line 7 by way of which a direct-current voltage VPS' is supplied. On the other hand, the MOS transistor Q2 has its drain connected to the output signal line 4-1, has its source connected to a signal line 8 by way of which image signals are fed out, and has its gate connected to the horizontal scanning circuit 2.

Figure 2:
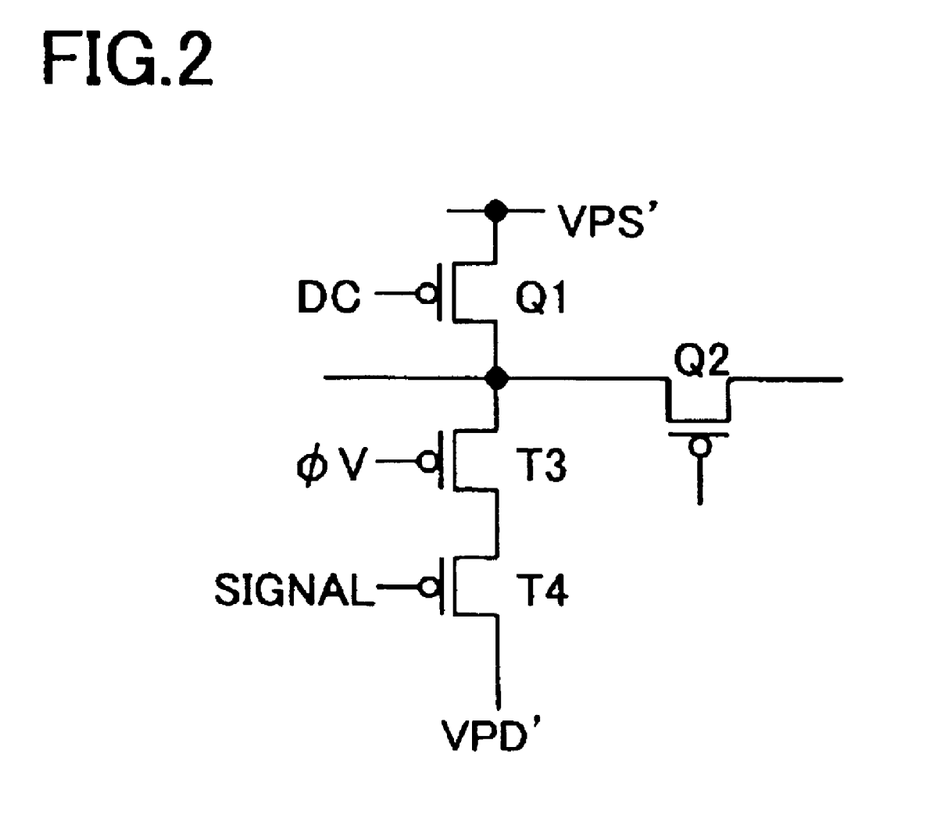
FIG. 2 is a diagram showing part of FIG. 1.

As will be described later, each of the pixels G11 to Gmn is provided with a P-channel MOS transistor T4 that outputs a signal based on the photoelectric charge generated in that pixel and a P-channel MOS transistor T3 that functions as a switch for electrically connecting to and disconnecting from one of the output signal lines 4-1 to 4-m. The interconnection among the MOS transistors T3, T4, Q1, and Q2 is shown in FIG. 2. Here, the MOS transistor Q1 keeps receiving a direct-current voltage DC at its gate all the time, and therefore the MOS transistor Q1 is equivalent to a resistor or constant current source. Thus, the MOS transistors T4 and Q1 constitute an amplifier circuit of a source follower type. In this case, the MOS transistor T4 is considered to output a current as the result of its amplification. The MOS transistor T3 functions as a switch for selecting a row, and the MOS transistor Q2 functions as a switch for selecting a column.

Moreover, the MOS transistor Q1 that serves as a load resistor for the amplifier circuit is provided not within each pixel but at each of the output signal lines 4-1 to 4-m. This helps reduce the number of load resistors or constant-current sources required and thereby reduce the area occupied by the amplifier circuit on the semiconductor chip.

First Embodiment

Figure 3:
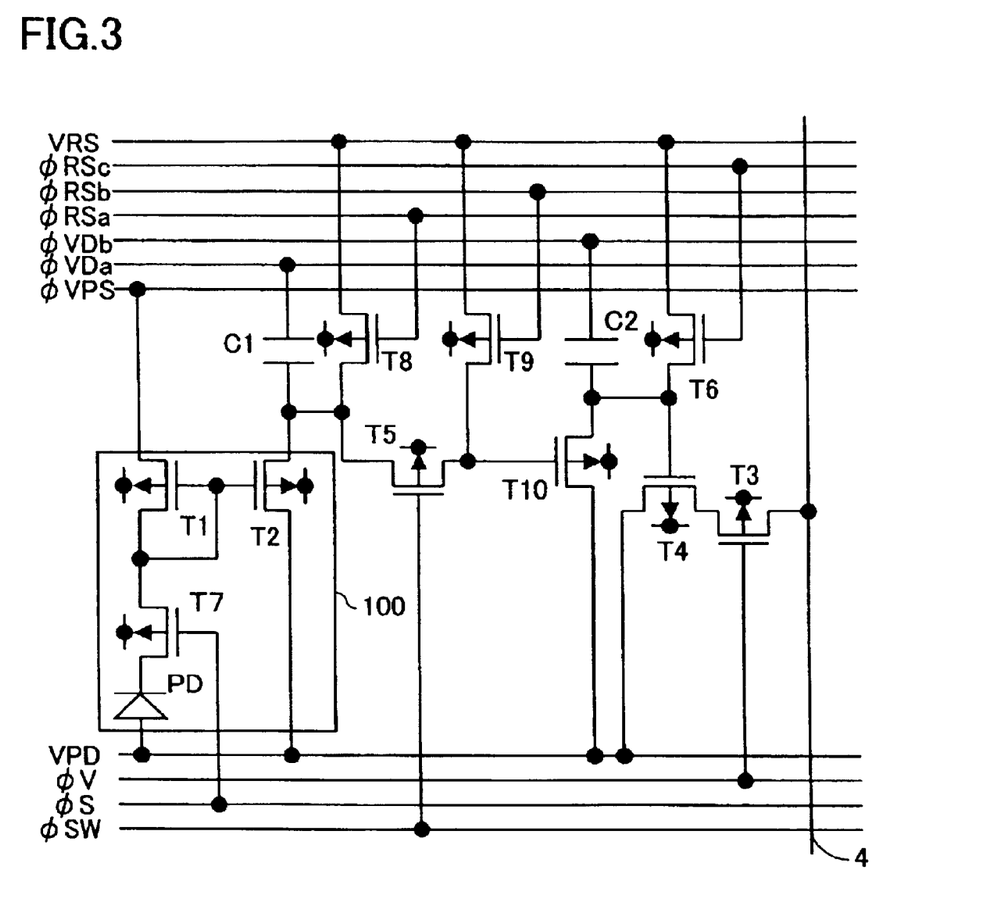
FIG. 3 is a circuit diagram showing the configuration of each pixel in a solid-state image-sensing device according to a first embodiment of the invention.

Now, the pixel configuration according to a first embodiment of the invention, to be applied to each pixel in the configuration shown in FIG. 1, will be described with reference to the drawings. FIG. 3 is a circuit diagram of the configuration of each pixel in a solid-state image-sensing device according to this embodiment.

In FIG. 3, a pn photodiode PD functions as a photosensitive element. The anode of the photodiode PD is connected to the drain of a MOS transistor T7, and the source of the MOS transistor T7 is connected to the gate and drain of a MOS transistor T1 and to the gate of a MOS transistor T2. The source of the MOS transistor T2 is connected to one end of a capacitor C1, which receives a signal φVDa at the other end. The node between the capacitor C1 and the source of the MOS transistor T2 is connected to the drain of a MOS transistor T5 and to the drain of a MOS transistor T8.

The source of the MOS transistor T5 is connected to the drain of a MOS transistor T9 and to the gate of a MOS transistor T10. The source of the MOS transistor T10 is connected to one end of a capacitor C2, which receives a signal φVDb at the other end. The node between the capacitor C2 and the source of the MOS transistor T10 is connected to the gate of a MOS transistor T4 and to the drain of a MOS transistor T6.

The source of the MOS transistor T4 is connected to the drain of a MOS transistor T3, and the source of the MOS transistor T3 is connected to an output signal line 4 (this output signal line 4 corresponds to the output signal lines 4-1, 4-2, ..., 4-m shown in FIG. 1). The MOS transistors T1 to T10 are all P-channel MOS transistors.

A direct-current voltage VPD is applied to the cathode of the photodiode PD and to the drains of the MOS transistors T2, T4, and T10. A direct-current voltage VRS is applied to the sources of the MOS transistors T6, T8, and T9. A signal φVPS is fed to the source of the MOS transistor T1. Signals φV, φSW, φS, φRSa, φRSb, and φRSc are fed to the gates of the MOS transistors T3, T5, T7, T8, T9, and T6, respectively. Here, the MOS transistors T1, T2, T7, and the photodiode PD together constitute a photoelectric conversion circuit 100.

The signal φVPS is a binary voltage signal that takes either a level VL that makes the MOS transistor T1 operate in a subthreshold region when the amount of incident light is above a predetermined level or a level VH that is higher than the level VL and that brings the MOS transistor T1 into a conducting state. The signals φVDa and φVDb are also binary voltage signals, the former taking either a level Vha at which the capacitor C1 performs integration or a level Vla that provides an offset voltage valid in the operating range of the MOS transistor T10, the latter taking either a level Vhb at which the capacitor C2 performs integration or a level Vlb that provides an offset voltage valid in the operating range of the MOS transistor T4.

Figure 4:
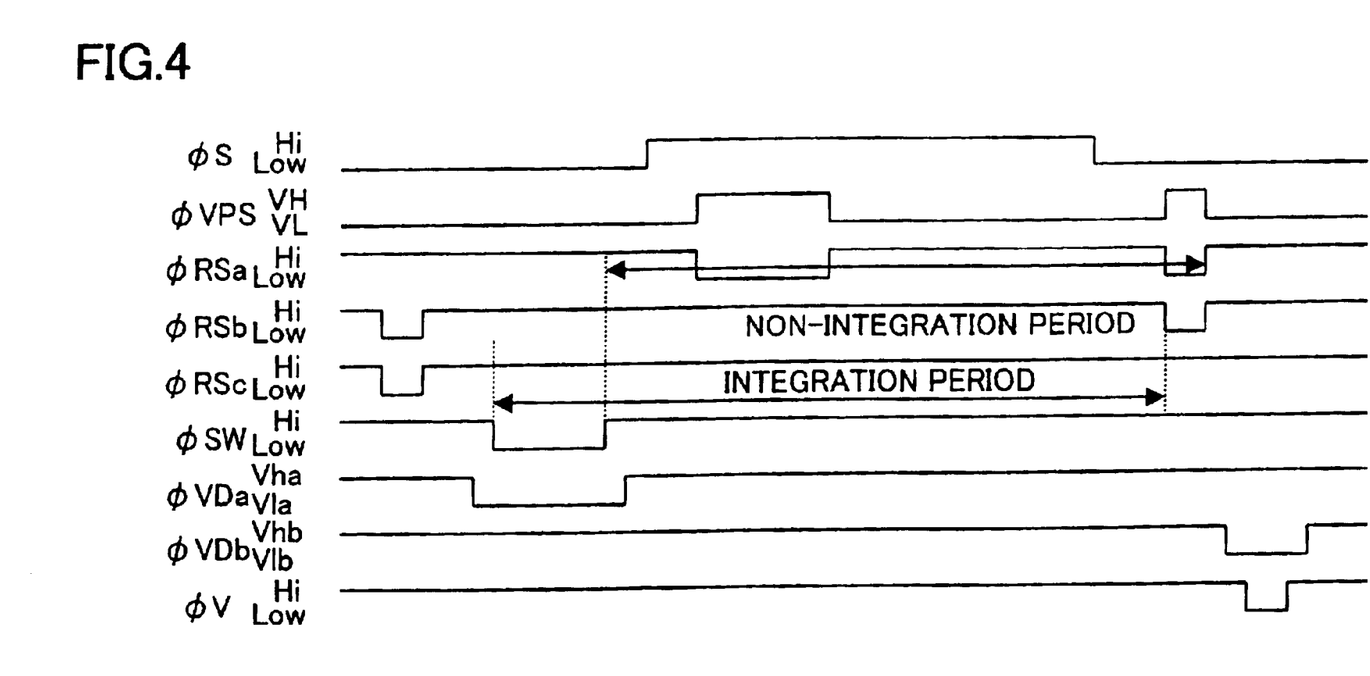
FIG. 4 is a timing chart showing the operation of the pixel shown in FIG. 3.

Now, the operation of the pixel configured as described above will be described with reference to a time chart shown in FIG. 4. When the signal φS is turned to a low level so that the MOS transistor T7 is turned on, and the signal φVPS is turned to the level VL, a photoelectric charge commensurate with the amount of incident light flows from the photodiode PD into the MOS transistor T1. As a result, a voltage commensurate with the amount of incident light appears at the gates of the MOS transistors T1 and T2, and a current commensurate with the amount of incident light flows through the MOS transistor T2. Thus, a negative electric charge flows through the MOS transistor T2 into the capacitor C1, making the capacitor C1 perform integration.

Here, if the brightness of the subject is low, the MOS transistor T1 remains in a cut-off state, and therefore a photoelectric charge is accumulated at the gate of the MOS transistor T1. Hence, a voltage linearly proportional to the amount of the incident light appears at the gates of the MOS transistors T1 and T2. Accordingly, the voltage that appears at the node between the capacitor C1 and the MOS transistor T2 is linearly proportional to the integral of the amount of incident light.

On the other hand, if the brightness of the subject is high, and thus the voltage commensurate with the photoelectric charge accumulated at the gate of the MOS transistor T1 is low, the MOS transistor T1 operates in a subthreshold region. Hence, a voltage natural-logarithmically proportional to the amount of incident light appears at the gate of the MOS transistor T1. Accordingly, the voltage that appears at the node between the capacitor C1 and the MOS transistor T2 is natural-logarithmically proportional to the integral of the amount of incident light.

Subsequently, first, the signal φRSb is turned to a low level to turn the MOS transistor T9 on and thereby reset the gate voltage of the MOS transistor T10, and simultaneously the signal φRSc is turned to a low level to turn the MOS transistor T6 on and thereby reset the voltage at the node between the source of the MOS transistor T10 and the capacitor C2. After these temporarily low pulses are fed in as the signals φRSb and φRSc, the signal φVDa is turned from the level Vha to the level Vla, and then a temporarily low pulse is fed in as the signal φSW.

When the φSW turns to a low level, the MOS transistor T5 turns on, and the voltage that appears at the node between the source of the MOS transistor T2 and the capacitor C1 is sampled at the gate of the MOS transistor T10. As a result, a current commensurate with the voltage sampled at the gate of the MOS transistor T10 flows through the source thereof, and thus a negative electric charge flows through the MOS transistor T10 into the capacitor C2, making the capacitor C2 perform integration. Here, turning the signal φVDa to the level Vla to feed an offset voltage to the MOS transistor T10 serves to permit the MOS transistor T10 to receive at its gate a voltage valid in its operating range.

Subsequently, the signal φSW is turned to a high level, and then the signal φVDa is turned to the level Vha. Moreover, after the signal φSW is turned to a high level, the signal φS is turned to a high level to turn off the MOS transistor T7 so that the photodiode PD is electrically disconnected from the MOS transistors T1 and T2. Here, a positive electric charge flows into the MOS transistor T1 through its source, and recombines with the negative electric charge accumulated at the gate and drain of the MOS transistor T1 and the gate of the MOS transistor T2. As a result, the potential at the gate and drain of the MOS transistor T1 rises up to a certain level.

Next, the signal φVPS is turned to the level VH to raise the source voltage of the MOS transistor T1. This increases the amount of positive electric charge that flows into the MOS transistor T1 through its source, and thus prompts the recombination of the negative electric charge accumulated at the gate and drain of the MOS transistor T1 and the gate of the MOS transistor T2. Then, the signal φRSa is turned to a low level to turn on the MOS transistor T8 so that the voltage at the node between the capacitor C1 and the source of the MOS transistor T2 is initialized.

Then, the signal φVPS is turned to the level VL so that the potential of the MOS transistor T1 is initialized, and then the signal φS is turned to a low level to turn on the MOS transistor T7 so that the MOS transistors T1 and T2 are electrically connected to the photodiode PD. Subsequently, the signal φVPS is turned back to the level VH so that the negative electric charge remaining in the photodiode PD is recombined and that the potentials in the photodiode PD and in the MOS transistors T1 and T2 are initialized. Then, the signal φVPS is turned to the level VL. Simultaneously, an temporarily low pulse is fed as the signal φRSa to the gate of the MOS transistor T8 to initialize the capacitor C1, and an temporarily low pulse is fed as the signal φRSb to the gate of the MOS transistor T9 to initialize the gate of the MOS transistor T10.

The signals φS, φSW, φVPS, φRSa to φRSc, and φVDa are operated with identical timing for all the pixels G11 to Gmn provided in the solid-state image-sensing device. This permits the electric signals obtained through image sensing operation performed with identical timing to be accumulated as image signals in the capacitor C2. That is, at the node between the capacitor C2 and the source of the MOS transistor T10 appears a voltage that is linearly or natural-logarithmically proportional to the integral of the amount of incident light.

Thereafter, for one row after another, the signal φVDb is turned to the level Vlb, and then an temporarily low pulse is fed as the signal φV to the MOS transistor T3 to turn it on. As a result, a current corresponding to the voltage commensurate with the integral of the amount of incident light as integrated by the capacitor C2 flows through the MOS transistor T4, and thus on the signal line 4 appears an image signal of which the voltage is commensurate with the integral of the amount of incident light. Here, turning the signal φVDb to the level Vlb to feed an offset voltage to the MOS transistor T4 serves to permit the MOS transistor T4 to receive at its gate a voltage valid in its operating range. Subsequently, the signal φV is turned to a high level, and the signal φVDb is turned to the level Vhb.

As the result of this sequence of operations being performed for one row after another, the image signals from all the pixels G11 to Gmn are fed out. Thereafter, for all the pixels G11 to Gmn, the signals φS, φSW, φVPS, φRSa to φRSc, and φVDa are again operated with identical timing just as described above.

In the solid-state image-sensing device configured as described above, the integration period in the capacitor C2 starts when the signal φSW is turned to a low level to turn on the MOS transistor T5 so that the voltage at the capacitor C1 is sampled at the gate of the MOS transistor T10, and ends when the φRSb is turned to a low level to turn on the MOS transistor T9 so that the gate of the MOS transistor T10 is reset. On the other hand, the non-integration period in the capacitor C1 starts when the signal φSW is turned to a high level to turn off the MOS transistor T5 so that the capacitor C1 is disconnected from the gate of the MOS transistor T10, and ends when the signal φRSa is turned to a high level for the second time to turn off the MOS transistor T8 so that the capacitor C1 is reset for the second time.

In this embodiment, the capacitor C1 is reset through the MOS transistor T8 and the gate of the MOS transistor T10 is reset through the MOS transistor T9. This permits the non-integration period to be controlled by adjusting the timing with which a pulse is fed in as the signal φRSa after the signal φS is turned to a low level.

Moreover, as distinct from FIG. 10, when the MOS transistor T5 is turned on, the voltage integrated by the capacitor C1 is first amplified by the MOS transistor T10 and is then integrated again by the capacitor C2. Here, the electric charge accumulated in the capacitor C1 is divided between the capacitance of the capacitor C1 itself and the gate capacitance of the MOS transistor T10. This gate capacitance, however, is extremely low compared with the capacitance of the capacitor C1, and therefore the sampling performed in the MOS transistor T10 causes almost no lowering in sensitivity. Moreover, the integrating circuit constituted by the capacitor C2 and the MOS transistor T10 for amplification has an amplification factor of 0.8, and therefore the sensitivity of the pixel is 0.8 times that obtained when the level integrated by capacitor C1 is fed out directly. Thus, the sensitivity of the pixel is 1.6 times that obtained when the capacitors C1 and C2 are connected in parallel as in the conventional configuration.

Second Embodiment

Figure 5:
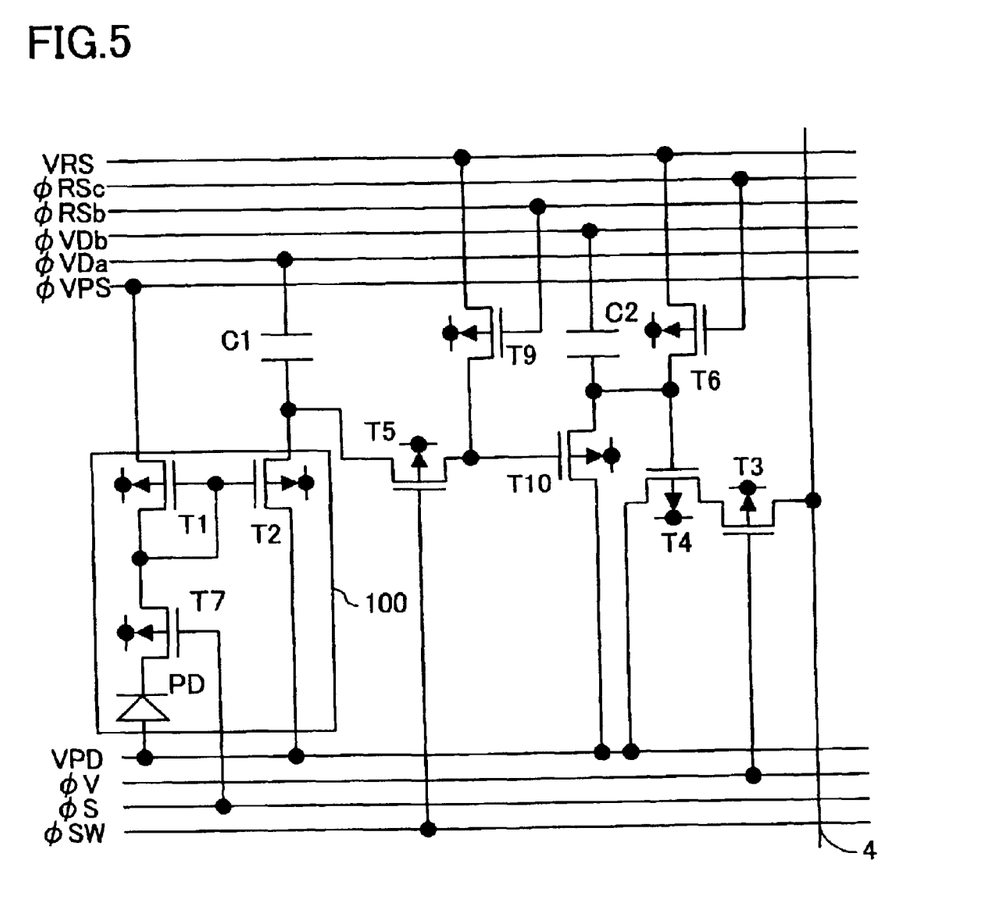
FIG. 5 is a circuit diagram showing the configuration of each pixel in a solid-state image-sensing device according to a second embodiment of the invention.

Next, the pixel configuration according to a second embodiment of the invention, to be applied to each pixel in the configuration shown in FIG. 1, will be described with reference to the drawings. FIG. 5 is a circuit diagram of the configuration of each pixel in a solid-state image-sensing device according to this embodiment. In FIG. 5, such circuit elements, signal lines, and others as serve the same purposes as in FIG. 3 are identified with the same reference numerals and symbols, and their detailed explanations will not be repeated.

As shown in FIG. 5, the pixel of this embodiment differs from that of the first embodiment (FIG. 3) in that the MOS transistor T8 for resetting the capacitor C1 is omitted. Accordingly, the capacitor C1 is reset together with the gate of the MOS transistor T10 when the MOS transistors T5 and T9 are turned on. Now, the operation of the pixel configured in this way will be described with reference to a time chart shown in FIG. 6.

Figure 6:
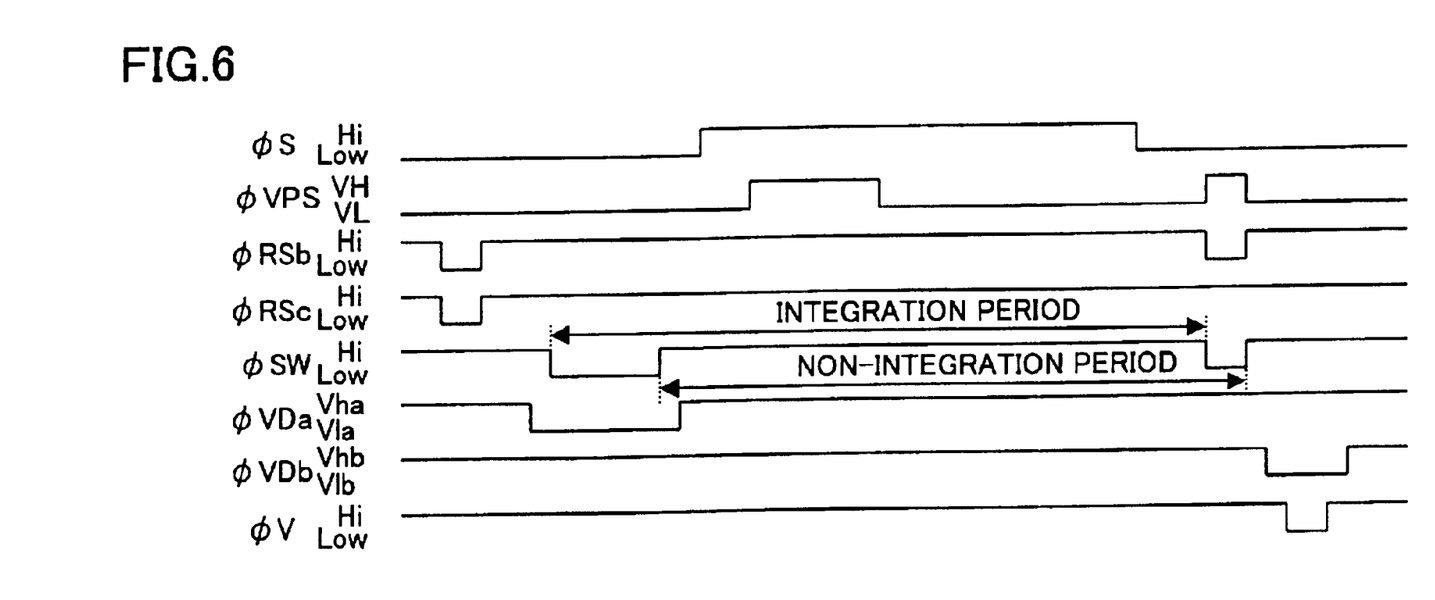
FIG. 6 is a timing chart showing the operation of the pixel shown in FIG. 5.

When the signal φS is turned to a low level so that the MOS transistor T7 is turned on, and the signal φVPS is turned to the level VL, a photoelectric charge commensurate with the amount of incident light flows from the photodiode PD into the MOS transistor T1. Thus, as in the first embodiment, a voltage linearly or natural-logarithmically proportional to the amount of incident light appears at the gates of the MOS transistors T1 and T2. Then, as a result of the integration performed by the capacitor C1, a voltage linearly or natural-logarithmically proportional to the integral of the amount of incident light appears at the node between the capacitor C1 and the source of the MOS transistor T2.

Subsequently, temporarily low pulses are fed as the signals φRSb and φRSc to the gates of the MOS transistors T9 and T6 to reset the gate of the MOS transistor T10 and the capacitor C2. Then, the signal φVDa is turned to the level Vla, and then a temporarily low pulse is fed in as the signal φSW. As a result, the voltage at the capacitor C1 is sampled at the gate of the MOS transistor T10. On completion of the sampling at the gate of the MOS transistor T10, the signal φVDa is turned to the level Vha.

Moreover, after the signal φSW is turned to a high level, the signal φS is turned to a high level to start resetting the potential states of the MOS transistors T1 and T2. Specifically, the resetting of the potential states of the MOS transistors T1 and T2 is achieved by first turning the signal φVPS to the level VH so that the negative electric charge accumulated at the gate and drain of the MOS transistor T1 and the gate of the MOS transistor T2 is recombined, and then turning the signal φVPS to the level VL.

Then, the signal φS is turned to a low level, and then the signal φVPS is turned back to the level VH to reset the potential states of the photodiode PD and the MOS transistors T1 and T2. Subsequently, the signal φVPS is turned to the level VL. Here, while the signal φVPS is held at the level VH, temporarily low pulses of which the period is equal to the period for which the signal φVPS is held at the level VH are fed in as the signals φRSb and φSW. In this way, the MOS transistors T9 and T5 are turned on so that the capacitor C1 and the gate of the MOS transistor T10 are reset.

As in the first embodiment, the signals φS, φSW, φVPS, φRSb, φRSc, and φVDa are operated with identical timing for all the pixels G11 to Gmn provided in the solid-state image-sensing device. In this way, after the image signals obtained through image sensing operation in all the pixels G11 to Gmn are transferred to their respective capacitor C2, the relevant portions are reset, and then the signal φVPS is turned to the level VL and the signals φRSb and φSW to a high level. Thereafter, for one row after another, the signal φVDb is turned to the level Vlb, then a temporarily low pulse is fed in as the signal φV so that the image signal transferred to the capacitor C2 is output to the signal line 4, and then the signal φVDb is turned to the level Vhb.

As the result of this sequence of operations being performed for one row after another, the image signals from all the pixels G11 to Gmn are fed out. Thereafter, for all the pixels G11 to Gmn, the signals φS, φSW, φVPS, φRSb, φRSc, and φVDa are again operated with identical timing just as described above.

In the solid-state image-sensing device configured as described above, the integration period in the capacitor C2 starts when the signal φSW is turned to a low level for the first time to turn on the MOS transistor T5 so that the voltage at the capacitor C1 is sampled at the gate of the MOS transistor T10, and ends when the φRSb is turned to a low level to turn on the MOS transistor T9 so that the gate of the MOS transistor T10 is reset. On the other hand, the non-integration period in the capacitor C1 starts when the signal φSW is turned to a high level for the first time to turn off the MOS transistor T5 so that the capacitor C1 is disconnected from the gate of the MOS transistor T10, and ends when the signals φSW and φRSb are simultaneously turned to a high level for the second time to turn off the MOS transistors T5 and T9 and thereby complete the resetting of the capacitor C1 for the second time.

In this embodiment, as distinct from the first embodiment, the non-integration period of the capacitor C1 is determined by the integration period of the capacitor C2. Although this makes it difficult to control the non-integration period, the omission of the MOS transistor T8 helps achieve a smaller circuit scale.

Figure 7:
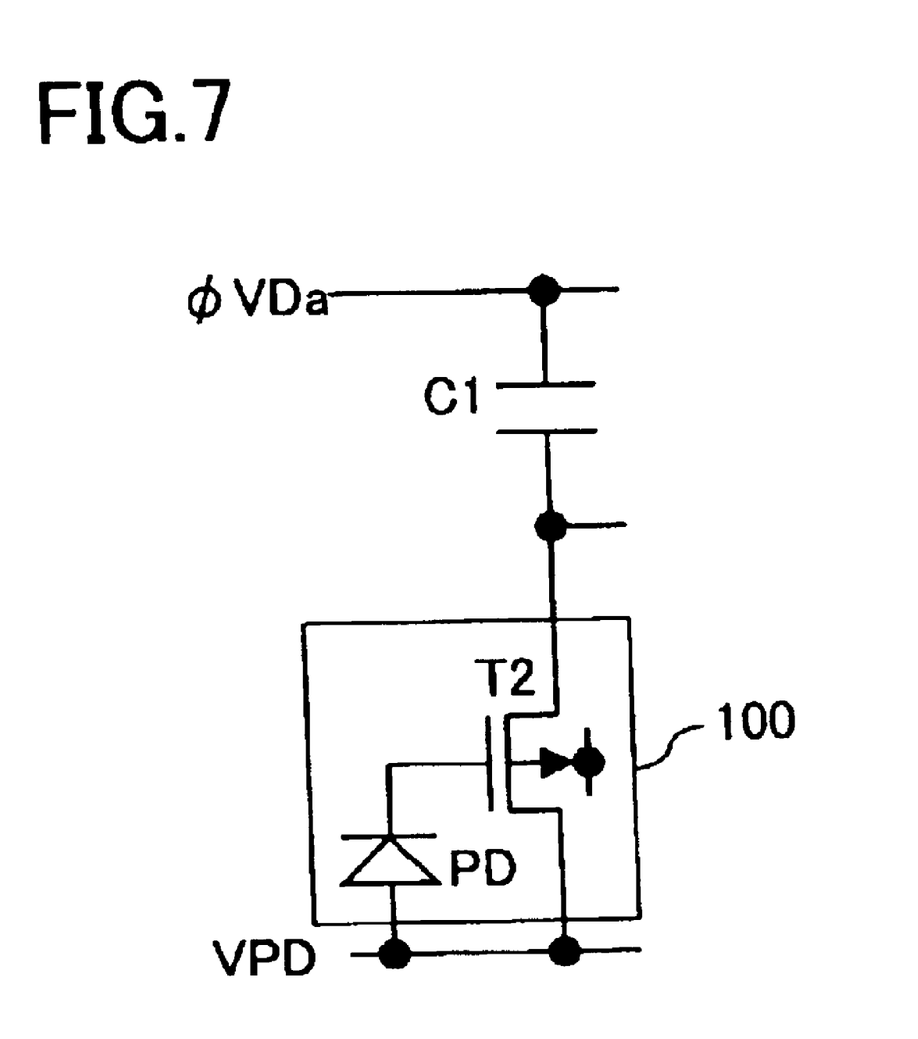
FIG. 7 is a circuit diagram showing another example of the configuration of the photoelectric conversion circuit.

In the first and second embodiments, the photoelectric conversion circuit 100 is composed of the MOS transistors T1, T2, and T7, and the photodiode PD. It is possible, however, to use instead a photoelectric conversion circuit configured as shown in FIG. 7 so as to perform linear conversion in which, compared with the one used in the embodiments, the MOS transistors T1 and T7 are omitted and the anode of the photodiode PD is connected to the gate of the MOS transistor T2. The photoelectric conversion circuit 100 may be configured in any other manner.

Figure 8:
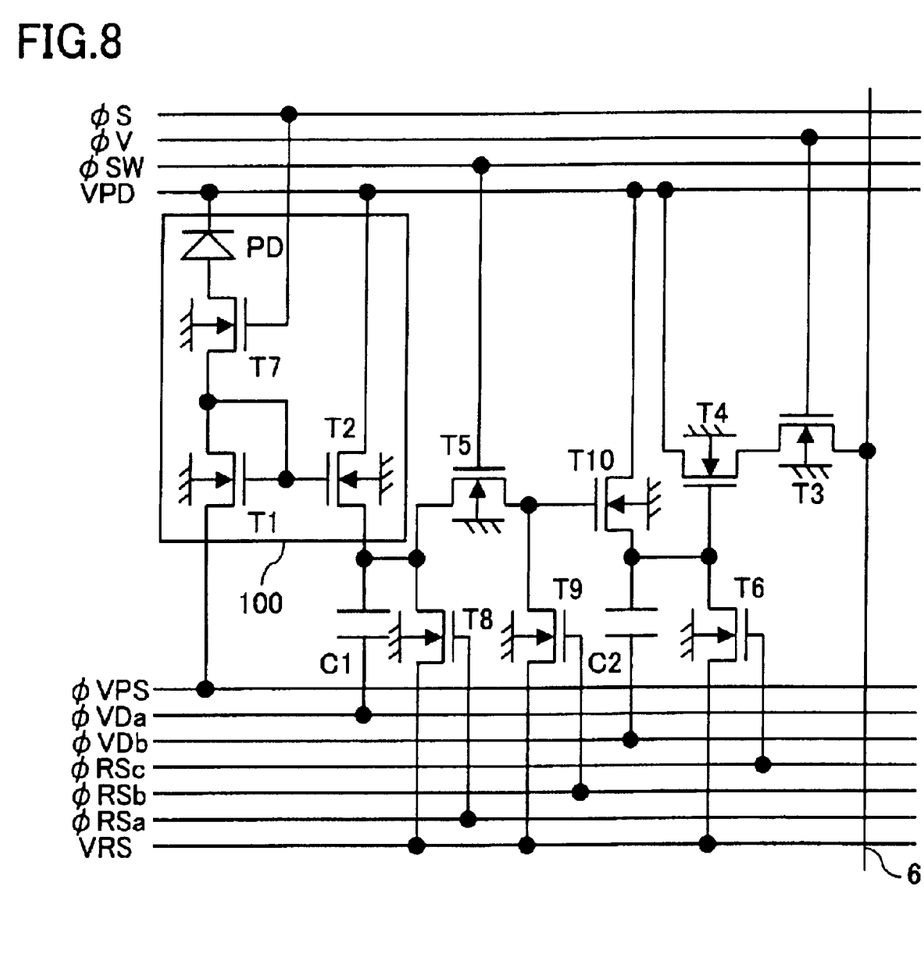
FIG. 8 is a circuit diagram showing the configuration of each pixel of a solid-state image-sensing device embodying the invention.
Figure 9:
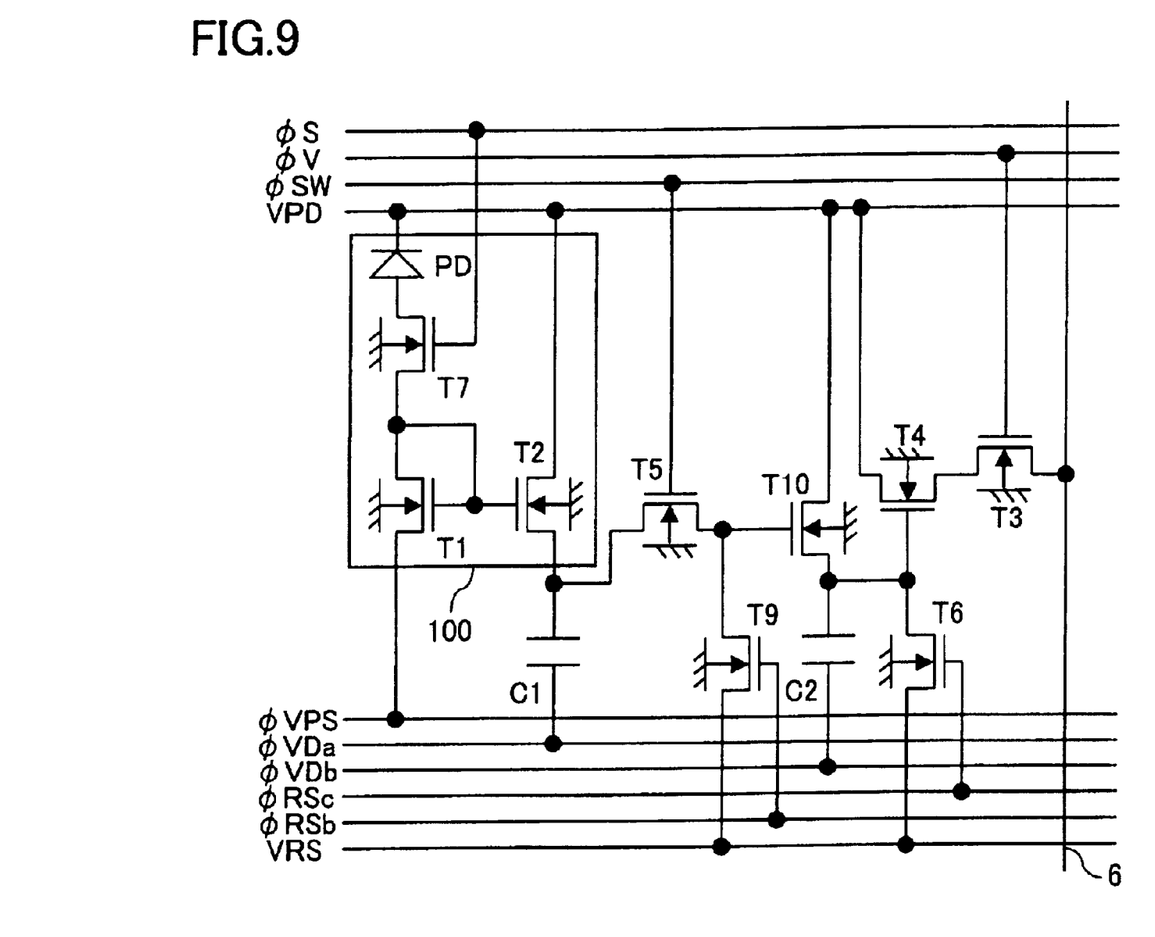
FIG. 9 is a circuit diagram showing the configuration of each pixel of a solid-state image-sensing device embodying the invention.

In the first and second embodiments, each pixel is reset in such a way that its operation is switched from linear conversion to logarithmic conversion at a predetermined level of brightness. It is possible, however, to make each pixel perform logarithmic conversion over the entire range of brightness. In each pixel, N-channel MOS transistors may be used instead of P-channel MOS transistors. In that case, the pixel of the first and second embodiments are configured as shown in FIGS. 8 and 9, respectively; specifically, while the individual circuit elements have opposite polarities, the interconnection among them remains the same.

According to the present invention, the output of a first-stage integrating circuit is amplified and then integrated by a second-stage integrating circuit. This helps make the gain of the image signal output from the second-stage integrating circuit higher than in the conventional configuration in which division of electric charge between capacitances is inevitable. In this way, it is possible to reduce loss in the second-stage integrating circuit and thereby alleviate the lowering, ascribable to the integrating circuits, in the sensitivity of the solid-state image-sensing device, achieving sensitivity about 1.6 times that obtained in the conventional configuration.

What is claimed is:

1. A solid-state image-sensing device comprising:
   a photoelectric conversion circuit that generates an amount of electric charge commensurate with an amount of incident light;
   a first integrating circuit that outputs a voltage obtained by accumulating the electric charge fed from the photoelectric conversion circuit; and
   a second integrating circuit that performs amplification based on the voltage fed from the first integrating circuit, performs integration by accumulating an electric charge obtained through the amplification, and outputs as an image signal a voltage obtained through the integration.

2. A solid-state image-sensing device as claimed in claim 1, further comprising:
   a switch that electrically connects and disconnects the first and second integrating circuits to and from each other.

3. A solid-state image-sensing device as claimed in claim 2, further comprising:
   a first reset circuit for resetting the first integrating circuit;
   a second reset circuit for resetting an input side of the second integrating circuit; and
   a third reset circuit for resetting an output side of the second integrating circuit.

4. A solid-state image-sensing device as claimed in claim 2, further comprising:
   a first reset circuit for resetting an input side of the second integrating circuit; and
   a second reset circuit for resetting an output side of the second integrating circuit,
   wherein, when the switch is turned on, the first reset circuit resets the output side of the first integrating circuit and the input side of the second integrating circuit simultaneously.

5. A solid-state image-sensing device as claimed in claim 1, wherein the second integrating circuit comprises:
   a transistor having a first electrode, a second electrode, and a control electrode, the transistor receiving at the control electrode thereof the voltage fed from the first integrating circuit; and
   a capacitor having one end thereof connected to the second electrode of the transistor,
   wherein a voltage appearing at a node between the second electrode of the transistor and the capacitor is used as the image signal.

6. A solid-state image-sensing device as claimed in claim 1, wherein the first integrating circuit comprises:
   a capacitor for accumulating the electric charge output from the photoelectric conversion circuit.

7. A solid-state image-sensing device as claimed in claim 1, further comprising:
   an output circuit that amplifies the voltage output from the second integrating circuit and outputs a resulting signal as the image signal.

8. A solid-state image-sensing device as claimed in claim 1, wherein the photoelectric conversion circuit outputs an electric signal that is natural-logarithmically proportional to the amount of incident light.

9. A solid-state image-sensing device as claimed in claim 1,
   wherein operation of the photoelectric conversion circuit can be switched between a linear conversion mode in which the photoelectric conversion circuit outputs an electric signal that is linearly proportional to the amount of incident light and a logarithmic conversion mode in which the photoelectric conversion circuit outputs an electric signal that is natural-logarithmically proportional to the amount of incident light.

10. A solid-state image-sensing device as claimed in claim 9, wherein the photoelectric conversion circuit operates in the linear conversion mode when the amount of incident light is lower than or equal to a predetermined level and switches to the logarithmic conversion mode when the amount of incident light exceeds the predetermined level.

11. A solid-state image-sensing device including a plurality of pixels, wherein the pixels each comprise:
    a photoelectric conversion circuit that generates an amount of electric charge commensurate with an amount of incident light;
    a first capacitor that accumulates the electric charge fed from the photoelectric conversion circuit;
    a switch having one end thereof connected to a node between the first capacitor and the photoelectric conversion circuit;
    a transistor having a first electrode, a second electrode, and a control electrode, the transistor having the control electrode thereof connected to another end of the switch; and
    a second capacitor having one end thereof connected to the second electrode of the transistor.

12. A solid-state image-sensing device as claimed in claim 11,
    wherein, in all the pixels, the first capacitor perfonus integration simultaneously, then the switch is turned on simultaneously so that the second capacitor performs integration simultaneously.

13. A solid-state image-sensing device as claimed in claim 11 wherein the transistor is a P-channel MOS transistor.

14. A solid-state image-sensing device as claimed in claim 11, wherein the transistor is an N-channel MOS transistor.

15. A solid-state image-sensing device as claimed in claim 11, wherein the pixels each further comprise:
- a first reset switch connected to one end of the first capacitor for resetting the first capacitor;
- a second reset switch connected to the control electrode of the transistor; and
- a third reset switch connected to one end of the second capacitor for resetting the second capacitor.

16. A solid-state image-sensing device as claimed in claim 11, wherein the pixels each further comprise:
- a first reset switch connected to the control electrode of the transistor; and
- a second reset switch connected to one end of the second capacitor for resetting the second capacitor, and
- wherein, by turning on the switch and the first reset switch, the first capacitor and the control electrode of the transistor are reset simultaneously.

17. A method for outputting an image signal in a solid-state image-sensing device, comprising:
- a step of generating an amount of electric charge commensurate with an amount of incident light;
- a step of outputting a first voltage obtained by accumulating the electric charge generated; and
- a step of outputting as an image signal a second voltage obtained by accumulating electric charge obtained by amplifying the first voltage.

18. A method for outputting an image signal as claimed in claim 17,
wherein the first voltage is output from a first integrating circuit, and the second voltage is output from a second integrating circuit.

19. A method for outputting an image signal as claimed in claim 17,
wherein the first voltage is obtained by accumulating an amount of electric charge that is natural-logarithmically proportional to the amount of incident light.

20. A method for outputting an image signal as claimed in claim 17, wherein the first voltage is obtained by accumulating an amount of electric charge that is linearly proportional to the amount of incident light when the amount of incident light is lower than or equal to a predetermined level and by accumulating an amount of electric charge that is natural-logarithmically proportional to the amount of incident light when the amount of incident light exceeds the predetermined level.

* * * * *